Nov. 26, 1968  R. W. OBARSKI  3,412,603

BRAKE TESTING DYNAMOMETER

Filed Dec. 16, 1966

INVENTOR.
RICHARD W. OBARSKI
BY
Oldham & Oldham
ATTYS.

United States Patent Office 3,412,603
Patented Nov. 26, 1968

3,412,603
BRAKE TESTING DYNAMOMETER
Richard W. Obarski, Stow, Ohio, assignor to Adamson United Company, Akron, Ohio, a corporation of Ohio
Filed Dec. 16, 1966, Ser. No. 602,250
7 Claims. (Cl. 73—121)

ABSTRACT OF THE DISCLOSURE

An apparatus for balancing and stabilizing the flywheel of a dynamometer for testing tires, wheels, brakes, and the like where a plurality of inertia discs or plates are secured to the flywheel in order to put proper load requirements on the tire, wheel, or brake which is connected to the rotating flywheel for test.

---

This invention relates to a brake testing dynamometer comprised of a flywheel journalled on a horizontal axis, wherein the flywheel is formed from a rotor shaft having a plurality of concentric bearing surfaces, with a disc shaped inertia plate being seated on each of the several bearing surfaces of the shaft. An annular wedge ring, or stabilizer means is also mounted on a bearing surface of the rotor shaft, the wedge ring or means being adapted to create a small gap between a particular inertia plate and the one adjacent thereto whereby as the centrifugal force of the rotating rotor shaft tends to force the inertia plate in a radially outward direction, the wedge will facilitate movement of the inertia plate in a radially outward direction and in an axial direction so that the inertia plates can move into tight fitting engagement with each other as well as being stabilized on the shaft to maintain the balancing of the flywheel of the dynamometer.

For a better understanding of the flywheel utilized in the dynamometer of the invention, reference should be had to the accompanying drawings wherein.

Figure 1:
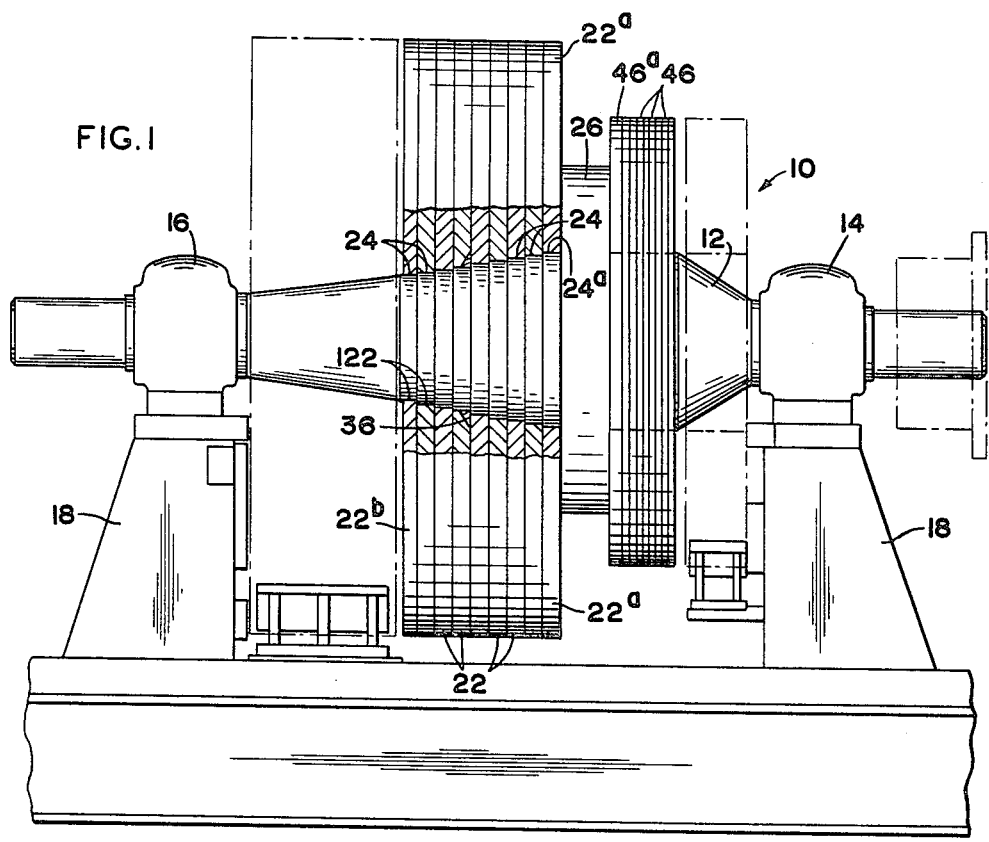
FIG. 1 is a broken away side elevation of a preferred embodiment of the flywheel utilized in the dynamometer of the invention.

Referring to the accompanying drawings in greater detail, and with particular reference to FIG. 1, the numeral 10 generally illustrates the flywheel of the invention. The flywheel 10 is journalled on a horizontal axis with the rotor or shaft 12 of the flywheel being journalled in a pair of pillow blocks 14 and 16. The pillow blocks 14 and 16 are supported by a suitable base or frame 18. The drive end of the shaft 12 is connected to a suitable motor (not shown) by conventional means which effects rotation thereof and of the flywheel 10. The other end of the shaft 12 acts as the driven end thereof and it is to this driven end that the item to be tested, for example, a wheel, a tire and/or a brake, or the like, is secured.

In order to accurately test the item which is secured to the driven end of the shaft 12, it is necessary to put the same or similar load requirements on the item to be tested as it will meet in standard operating conditions. This is achieved by positioning a plurality of heavy, disc shaped inertia plates 22 which will rotate with the shaft 12 as it is driven. Under usual testing conditions, it is necessary to drive the shaft 12 at a very high rate of r.p.m. As a result, it is imperative to balance and secure the inertia plates 22 to the rotor shaft 12 properly so that unbalance conditions will not cause vibration in the flywheel 10 as the dynamometer is operated. It is the main purpose of the present invention to provide a new and unique way of securing at least one of the inertia discs 22 to the shaft 12 of the flywheel 10 in order to insure proper rotary stabilization or balancing and to eliminate vibration.

In order to achieve a balanced and tight fitting mounting of the inertia discs 22 to the shaft 12, the shaft is preferably formed down a plurality of progressively reduced diameter bearing surfaces 24 which are concentric with each other. The disc shaped inertia plates 22 each have a central aperture or hole 122 provided therein which corresponds in the size of opening thereof to a respective bearing surface 24 of the shaft 12. These plates 22 are usually positioned on the bearing surfaces 24 to be free for some axial movement therealong.

In order to secure the inertia discs to the shaft 12, a radially extending flange 26 is provided on or secured to the shaft 12. As is illustrated by FIG. 2, suitable bolt means 28 are provided which extend through an aperture 30 in inertia plate 22a and which engage the flange 26 in order to secure the inertia plate 22a to the shaft 12.

The remaining inertia plates 22 are secured to the shaft 12 by a plurality of circumferentially spaced tie bolt means 32 which extend through respective aligned apertures 34 in each of the other inertia plates 22 as well as through the inertia plate 22a. Since inertia plate 22a is firmly secured to the flange 26, and since all of the remaining inertia plates 22 are securely fixed to the inertia plate 22a, such arrangement achieves a tight fitting and compact relationship of each of the inertia plates 22 so that they are properly secured together as a unit. The shaft 12 is balanced after each plate is secured thereto and the plates are brought into abutting contact by the tie bolts 32. The plates, for example, may be about 1½ inches thick with a diameter of 48 inches, but the thickness of the different plates may vary slightly from plate to plate.

Due to the high rotation speed imparted to the shaft 12 as the flywheel 10 of the dynamometer is operated, relatively high resulting centrifugal forces are produced which tend to throw the inertia plates 22 radially outward of and away from their respective bearing seats 24, and, in other words, the plates 22 grow circumferentially in use more than the shaft 12. In order to compensate for such action which can destroy the balance or stabilization of the inertia plate and flywheel assembly, an annular wedge ring or stabilizer means 36 is seated on the shaft and secured to an inclined portion or beveled corner formed at the center aperture 122 of one of the centrally positioned inertia plates, for example, the inertia plate 22c. As is best illustrated by FIGS. 2 and 3, the wedge ring 36 is of a substantially triangular shape in cross section and is secured, as by shoulder screws 38, to an inclined complementary portion or face 35 on a radially inner beveled corner of inertia plate 22c. There is some clearance between the shoulder screws 38 and the bored and counterbored holes in wedge ring 36 which allow concentric movement of the inertia plate 22c in relation to the wedge ring 36 as will be explained in greater detail hereinafter. Since the wedge ring 36 has a surface 37 that is complementary to the inclined portion 35 of the inertia plate 22c, the wedge ring 36 normally exactly matches the central aperture of the inertia plate 22c when at rest and is in alignment therewith so that the wedge ring seats snugly on the same bearing surface 24b of the shaft 12 as does the inertia plate 22c.

Figures 2, 3:
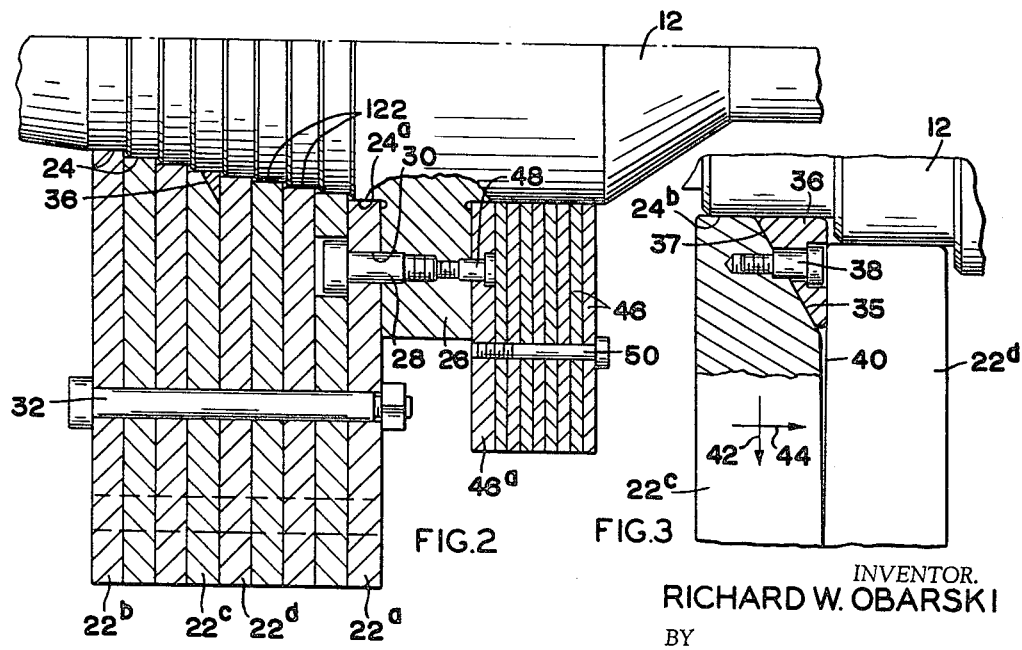
FIG. 2 is a fragmentary, enlarged vertical section of the flywheel of FIG. 1, particularly illustrating the way in which the inertia plates are seated on concentric bearing surfaces of the rotor shaft of the flywheel.
FIG. 3 is an enlarged, fragmentary vertical section of the flywheel of FIGS. 1 and 2, particularly illustrating the annular wedge means utilized in the flywheel.

As is best illustrated by FIG. 3, the wedge ring means 36 slightly protrudes in an axial direction from the adjacent side face of the inertia plate 22c to which it is secured so that a small gap or opening 40 of at least several thousandths of an inch is created between such face of inertia plate 22c and the inertia plate 22d which is adjacent thereto. In the assembly, the plates 22b to 22d are distorted, or sprung into contact in their radially outer portions by the tie bolt tension. The opening 40 is made large enough that it will not limit the action of the inertia plate 22c in creeping out radially and axially on the wedge ring.

The purpose of such wedge ring 36 is that as the centrifugal force created by rotation of the shaft 12 tends to move inertia plate 22c in an outward direction, since there is a gap 40 created between the inertia plates 22c and 22d, the inertia plate 22c is relatively free to move in a radially outward direction, as indicated by arrow 42. As such radially outward movement occurs, however, the inclined edge or surface 35 of the inertia plate 22c will tend to slide along the inclined surface or face 37 of the wedge ring means 36. Such sliding movement of the inertia plate also causes the inertia plate 22c to move in an axial direction, or in the direction of arrow 44, as well as in the radial direction which is indicated by arrow 42. Such slight axial movement of the inertia plate 22c as it is moving in a radially outward direction causes the gap 40 between inertia plates 22c and 22d to be eliminated and all of the plates are forced into tight fitting engagement with each other. However, the ring or stabilizer means 36 remains concentric with the shaft even after the center holes 122 of the plates have grown or expanded away from the shaft under high speed conditions.

It has been found in actual practice that one wedge ring 36 seated substantially in the axial central portion of the shaft 12 effectively allows slight concentric radial outward movement of the inertia plates 22, and yet still maintains the inertia plates in tight fitting, balanced engagement with each other and the shaft as such radial outward movement occurs. Because of the large difference in weight and outside diameter between the wedge ring 36 and the inertia plate 22c, the radial and circumferential growth at high speeds is much greater in the plates 22 than in the wedge ring 36 which remains essentially in engagement with the shaft 12. It should be understood that more than one wedge ring 36 can be utilized, particularly when more inertia plates 22 are used, or when the rotor shaft 12 is driven at a substantially higher r.p.m. rate. It has been found, however, that in order to accomplish the purposes of the invention, one wedge ring 36 is sufficient.

A plurality of auxiliary inertia plates 46 can also be secured to the rotor shaft 12, in substantially the same manner that the main inertia plates 22 are secured thereto. A suitable bolt 48 seats in and secures auxiliary inertia plate 46a to the rotor flange 26 and a plurality of spaced bolt means or screws 50 secured the remaining auxiliary plates 46 to auxiliary inertia plate 46a.

As is easily understood, the angle of the inclined edge or portion 35 of the inertia plate 22c with the surface 24 and hence the complementary angle of the face or edge 37 must be such that it overcomes the coefficient of friction between the wedge ring means 36 and the inclined face portion of inertia plate 22c so that the inertia plate 22c will slide in radial directions along the wedge ring means 36 as the speed of rotation of the shaft 12 changes. This can be defined from the standpoint that the angle of the wedge (inclined portion 35) must be an angle appreciably greater than an angle whose tangent is equal to the coefficient of friction of the abutted surfaces (inclined complementary faces 35 and 37). It has been found, for example, that if the abutted surfaces are bronze and steel, such angle whose tangent is equal to the coefficient of friction is approximately 20° to 25° depending upon the surface finishes, lubrication, etc. Thus a 60° angle of the inclined portion 35 is used in this instance.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. In a dynamometer, including a shaft, journal means for said shaft, a plurality of disc shaped inertia plates each having a central aperture therein seated on said shaft in abutting relation to each other, means tightly securing said plates together at the radially outer portions thereof to form an assembly thereof, means securing said plates to said shaft for rotation therewith, the improvement comprising
  one of said plates adjacent the axial center of the assembly thereof having a beveled corner formed at its center aperture, and
  an annular wedge ring means, substantially triangular in cross section, and secured in complementary relationship to said beveled corner of said one of said inertia plates, said wedge ring means seating on said shaft.

2. A dynamometer according to claim 1 wherein said wedge ring means protrudes slightly in an axial direction from the face of the inertia plate to which it is secured, thereby creating a gap in the at rest condition between the radially inner portion of the face of the inertia plate to which said wedge ring means is secured and the inertia place adjacent thereto.

3. A dynamometer according to claim 2 wherein the centrifugal force in said inertia plates as they are rotated tends to move the inertia plate to which said wedge ring means is secured in a radially outward direction to thereby cause the inclined face of said inertia plate to slide on the inclined surface of said wedge ring means to move said inertia plate in an axial direction as well as a radial direction and toward the inertia plate adjacent thereto, said movable inertia plate remaining in tight concentric engagement with said wedge ring means.

4. A dynamometer according to claim 2 wherein said gap between the inertia plate to which said wedge ring means is secured and the inertia plate adjacent thereto is at least several thousandths of an inch.

5. A dynamometer according to claim 1 wherein said shaft is formed from a plurality of stepped, progressively reduced diameter bearing surfaces concentric with each other, each inertia plate being seated on a respective bearing surface of said shaft.

6. A dynamometer according to claim 5 and including
  a rotor flange secured to and radially extending from said rotor shaft
  circumferentially spaced bolt means securing the inertia plate seated on the largest diameter bearing surface to said rotor flange
  a plurality of tie bolt means extending through respective aligned apertures in radially outer portions of said other inertia plates and securing said other inertia plates to the inertia plate secured to said rotor flange.

7. A dynamometer according to claim 1 where the surface of said beveled corner and the complementary surface of said wedge ring means are at an angle to the axis of said shaft appreciably greater than the angle whose tangent is equal to the coefficient of friction of the abutted surfaces.

References Cited

UNITED STATES PATENTS

| | | | |
|---|---|---|---|
| 2,084,547 | 6/1937 | Allen | 73—121 |
| 2,380,770 | 7/1945 | McFarland | 74—574 |
| 3,146,619 | 9/1964 | Sinclair et al. | 73—133 XR |
| 3,285,096 | 11/1966 | O'Connor | 74—574 |

RICHARD C. QUEISSER, *Primary Examiner.*

C. A. RUEHL, *Assistant Examiner.*